United States Patent [19]

Jachimowicz et al.

[11] Patent Number: 4,995,718

[45] Date of Patent: Feb. 26, 1991

[54] FULL COLOR THREE-DIMENSIONAL PROJECTION DISPLAY

[75] Inventors: Karen E. Jachimowicz, Goodyear; Ronald S. Gold, Scottsdale, both of Ariz.

[73] Assignee: Honeywell Inc., Minneapolis, Minn.

[21] Appl. No.: 437,488

[22] Filed: Nov. 15, 1989

[51] Int. Cl.⁵ .................... G02B 27/28; G02B 27/22
[52] U.S. Cl. ....................................... 353/31; 353/33; 350/132
[58] Field of Search ............... 353/31, 33, 7, 8, 34, 353/20; 350/130, 131, 132

[56] References Cited

U.S. PATENT DOCUMENTS

| | | | |
|---|---|---|---|
| 2,949,055 | 8/1960 | Blackstone | 350/130 |
| 3,507,549 | 4/1970 | Land | 350/132 |
| 3,944,351 | 3/1976 | Ito et al. | 353/31 |
| 4,286,286 | 8/1981 | Jurisson et al. | 358/92 |
| 4,500,172 | 2/1985 | Gagnon et al. | 353/31 |
| 4,504,856 | 3/1985 | Jackman | 358/92 |
| 4,588,259 | 5/1986 | Sheiman | 350/132 |
| 4,670,744 | 6/1987 | Buzak | 340/716 |
| 4,717,239 | 1/1988 | Steenblik | 350/144 |
| 4,719,507 | 1/1988 | Bos | 350/132 |
| 4,723,159 | 2/1988 | Imsand | 358/88 |
| 4,737,840 | 4/1988 | Morishita | 358/88 |
| 4,772,094 | 9/1988 | Sheiman | 350/133 |
| 4,792,850 | 12/1988 | Liptoh et al. | 350/132 |
| 4,872,750 | 10/1989 | Morishita | 353/7 |
| 4,877,307 | 10/1989 | Kalmanash | 350/132 |

Primary Examiner—William A. Cuchlinski, Jr.
Assistant Examiner—William C. Dowling
Attorney, Agent, or Firm—John G. Shudy, Jr.

[57] ABSTRACT

A compact, high resolution, full color three-dimensional projection system having a single display system and utilizing image polarization for color multiplexing.

27 Claims, 8 Drawing Sheets

FULL COLOR THREE-DIMENSIONAL PROJECTION DISPLAY

FIELD OF THE INVENTION

The present invention pertains to projection display systems and particularly to color systems. More particularly, the invention pertains to three-dimensional (3D) systems.

BACKGROUND OF THE INVENTION

In the related art, there are various kinds of 3D color projection and/or display systems. One approach has two projectors or display systems, where one projector provides a right eye display and the other a left eye display on a screen, each display having its own polarization, for instance, "P" and "S", respectively. The viewer wears polarized glasses which let the eyes see a stereoscopic display for 3D viewing. Another system has a single display that interlaces right and left eye images, each image having its own polarization. The images are perceived by the eyes through polarized glasses for 3D viewing. There are many 3D color display systems in the art, but the applicants know none that are like the present invention.

SUMMARY OF THE INVENTION

The present invention provides a compact, high resolution, full color 3D display system using a single projection display. The invention permits the use of a high resolution and luminance cathode ray tube (CRT), light valve, or laser projection system wherein color addition typically generates the full color image. That is, the invention takes advantage of the principles of color combining schemes that accommodate the combined colors' polarizations, which are applicable to the present 3D scheme.

The advantages of the present invention are having the single display system using front or rear projection, higher 3D color image resolution than combining multicolor displays, greater luminance than the full color, dual channel approaches of similar physical size, higher image resolution than typical time-multiplexed systems, which must operate at 120 hertz (Hz) field rate, minimal interocular crosstalk due to the elimination of timing and resulting sync problems of 120 Hz operation, flexibility of using separate processors to generate images in parallel for each eye, compatibility with liquid crystal displays which generate polarized images, and the implementation of dichroic image combiners which have very high polarized light efficiencies. The invention can be used to easily convert present commercial and military full color projection systems to 3D without loss of resolution.

The present invention incorporates colors and polarizations to project a 3D image originating from three monochrome image sources and an additive color combining system. Image signals to a green channel result in an output of one polarization which is seen by one of the viewer's eyes. Image signals to a red and blue (magenta or minus green) channel result in an output of another polarization which is seen by the other of the viewer's eyes. The outputs, having two different polarizations, are assured of being perceived by different eyes of the viewer due to the latter's wearing polarized glasses. Linear or circular polarization may be utilized. A 90 degree phase retarder (i.e., quarter-wave plate) is inserted between the projection means and the viewer to change the type of polarization, if circular polarization is desired. An electronically controlled half-wave plate is used to alternate the polarizations of the left and right channels to the viewer so that the color sensed by each eye is not constant.

DESCRIPTION OF THE PREFERRED EMBODIMENTS

Figure 1:
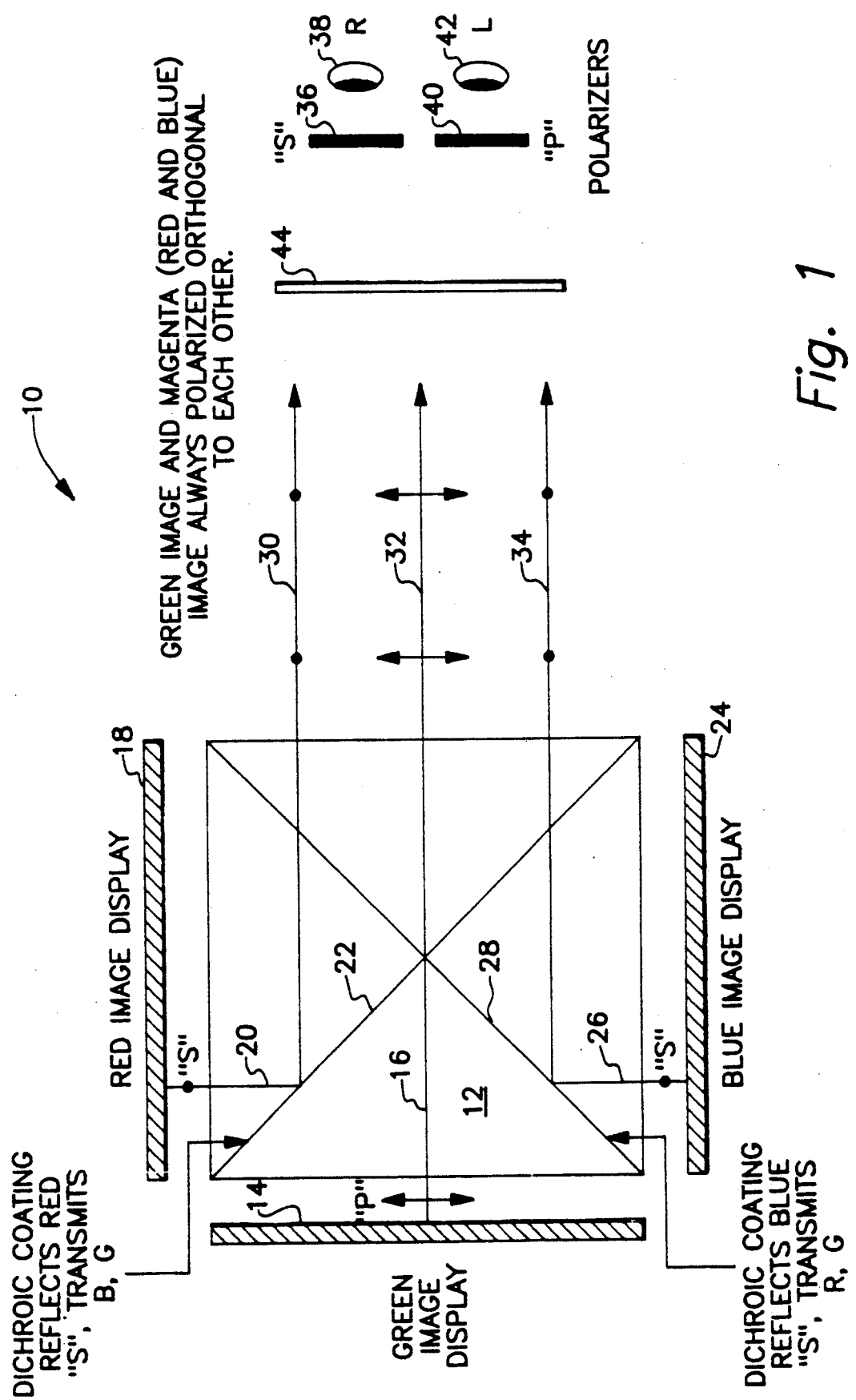
FIG. 1 shows a cube beam polarizer/combiner.

FIG. 1 illustrates a three color additive projection system and wherein three monochrome image display sources 14, 18 and 24 have images which are combined with combiner prism 12 which result in a full color, colinear image. A characteristic of combiner prism 12 is that each image from display sources 14, 18 and 24 can be linearly polarized. The "S" polarized images 20 and 26 are favored in reflection thereby resulting in blue image 26 and red image 20 being "S" polarized. The "P" polarization (which is orthogonal to the "S" polarization) is favored in transmission through combiner prism 12 thereby resulting in green image 16 being "P" polarized. Green image display 14 which sends image 16 through prism 12 exits prism 12 as image 32 onto screen 44. Red image 20 comes from red image display 18 and impinges dichroic coating 22 which reflects red "S" polarized light and transmits blue and green light. Image 20 is reflected as image 30 as it exits from prism 12 onto screen 44. Dichroic coating 22 is a short wave pass coating. Blue image 26 from display 24 impinges dichroic coating 28 which is a long wave pass coating that reflects blue as polarized light and transmits red and green light. Image light 26 is reflected out of prism 12 as image 34 onto screen 44. Polarized images 30, 32 and 34 are utilized to create a polarized 3D display on screen 44 by sending, for example, a left eye's view via green image display 14 and the right eye's view via red image display 18 and blue image display 24. A viewer with polarized glasses looking at screen 44 will see each eye's view or a different perspective of the image with each eye, respectively, resulting in the perception of a 3D color image. Right eye 38 sees only the "S" polarized blue and red (magenta) images 30 and 34 on screen 44 through "S" polarizer 36 which blocks out image 32 on screen 44. Left eye 42 sees green image 32 on screen 44 through "P" polarizer 40 which blocks out red image 30 and blue image 34. Green image 32 represents the perspective of a scene that left eye 42 normally would see; and both red image 30 and blue image 34 represent the perspective of a 3D scene that right eye 38 normally would see. Thus, images 30 and 34 and image 32, as perceived by right eye 38 and left eye 42, respectively, are combined in the brain to provide the viewer with a 3D perception of the image being presented. Green image 32 and magenta (red and blue) image 30 and 34 are always polarized orthogonal to each other. Thus, device 10 presents 3D images with color multiplexing. Alternatively, display source 18 or 24 of system 10 or 50 may be a magenta image display source and the remaining red or blue display source may be eliminated.

Combining prism 12 is a cube cut along lines where coatings 22 and 28 can be and are applied. Prism 12 may be cut into 4 triangular units or two interlocking units each having two triangular portions. The cuts are made perpendicular to an observer's normal horizontal reference. Combiner 12 may be a fluid or any other optical device that accomplishes the functions of reflection and combining for the invention. If the cube does not provide the means for polarizing the three images, then polarizers can be placed in front of the displays to perform this task.

Figure 2:
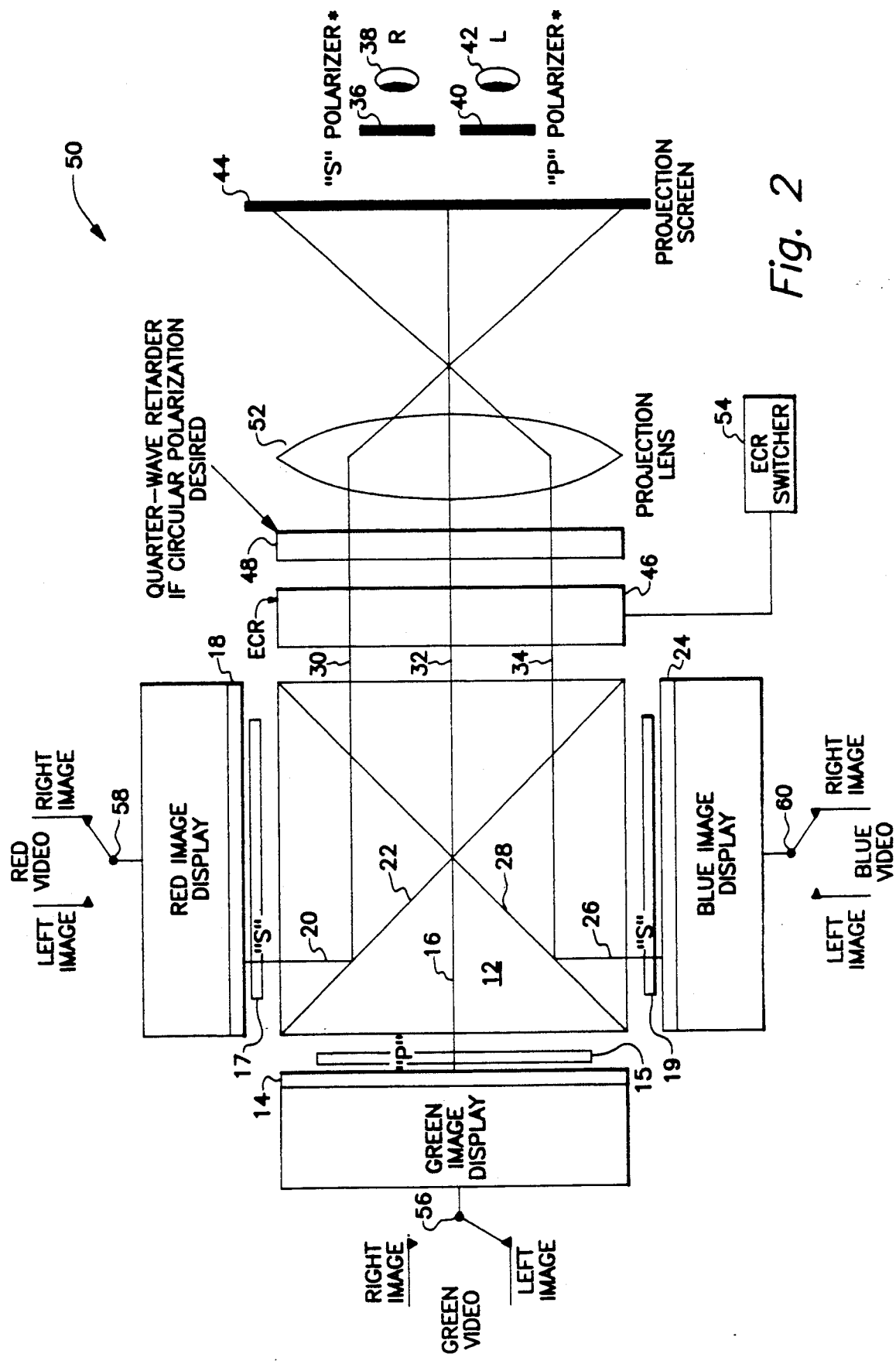
FIG. 2 shows a 3D projection display using polarized color multiplexing and on-axis projection.

The device 50 of FIG. 2 is an expansion of the device 10 of FIG. 1. Lenses 15, 17 and 19 are for adjusting the focal lengths and paths of imagery light from display sources 14, 18 and 24, respectively. With the device 10 of FIG. 1, there is a possibility of binocular rivalry caused by left eye 42 seeing only green and right eye 38 seeing only red and blue. Electrically controllable half wave plate or retarder (ECR) 46 is used to eliminate that possibility of binocular rivalry. ECR 46 switches polarization states, that is, "S" to "P" and vice versa, thereby resulting in left eye 42 seeing red and blue images 30 and 34 and right eye 38 seeing green image 32. To maintain the right perspective of the three-dimensional scene and the left perspective of the scene to right eye 38 and left eye 42, respectively, image perspectives of the scene to sources 14, 18 and 24, are switched by switches 56, 58 and 60 simultaneously as ECR 46 switches polarization states. As switch 56 switches from left image to right image, switches 58 and 60 switch from right image to left image, and vice versa. ECR 46 is switched by ECR switcher 54 which tracks switching of switches 56, 58 and 60, or switches 56, 58 and 60 switch at the same time as ECR 46 is switched. Polarization switching and right/left image switching do not need to be done at a fast rate. A sufficient rate of switching is several times per second, but the switching is done at 60 Hz during vertical blanking. Structurally, in device 50, ECR 46 is typically inserted after the combiner prism and before projection screen 44. An example of ECR 46 is a liquid crystal cell having a thickness set to retard an incident wave by one half lambda, that is, one half of a wavelength, when the cell is switched on. ECR 46 may be a Tektronix pi cell.

"S" and "P" linear polarizations may be converted to left and right circular polarization states with quarter wave retarder 48 inserted between combiner prism 12 and projection lens 52. "S" polarized red and blue images 30 and 34 are converted to left circularly polarized images with quarter wave retarder 48. "P" polarized green image 32 is converted to a right circularly polarized image. Then circularly polarized images 30, 32 and 34 are projected unto non-depolarizing screen 44. The viewer will see a full color 3D image on screen 44 provided the viewer is wearing circularly polarized glasses. "S" polarizer lens 36 is replaced with a left circular polarized lens and "P" polarized lens 40 is replaced with a right circular polarized lens.

Figure 3:
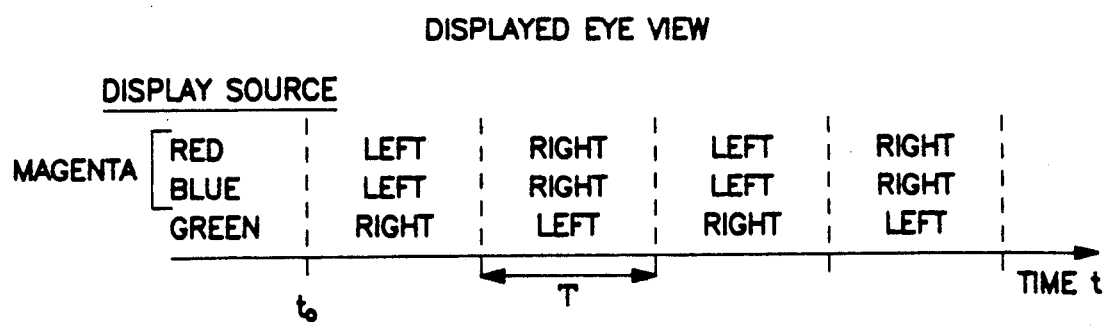
FIG. 3 is a table indicating the sequence of colors presented to each of the eyes.
Figure 4A:
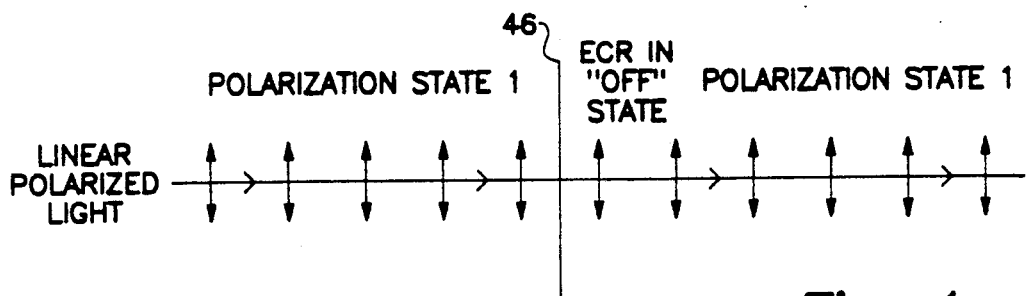
FIG. 4 illustrates the operation of the electrically controllable retarder.
Figure 4B:
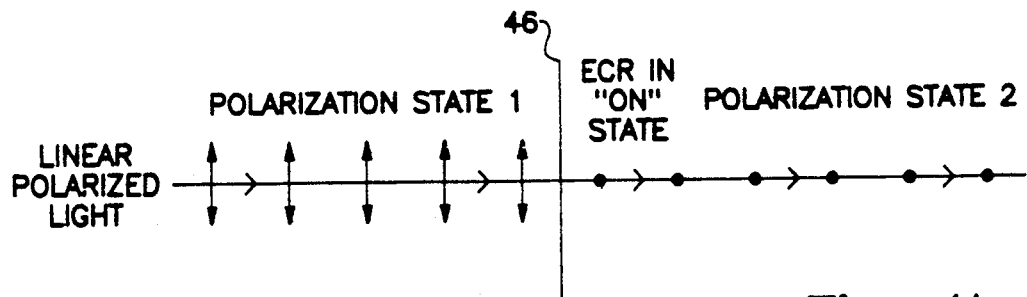

FIG. 3 illustrates the sequence of colors of the scene perspectives as presented to each eye of the observer. The view (left or right) of the image from each source changes after time T, which is in sync with ECR 46's changing the polarities of the images. T may be any time, but one-sixtieth of a second is a convenient time period for use with video electronics. FIG. 4a and 4b illustrate the operation of ECR 46. In FIG. 4a, ECR 46 is in an "off" state and the polarization of the light transmitted through ECR 46 does not change. In FIG. 4b, ECR 46 is in the "on" state and the polarization state does change (linear polarization rotates 90° and circular polarization reverses direction).

Figure 5:
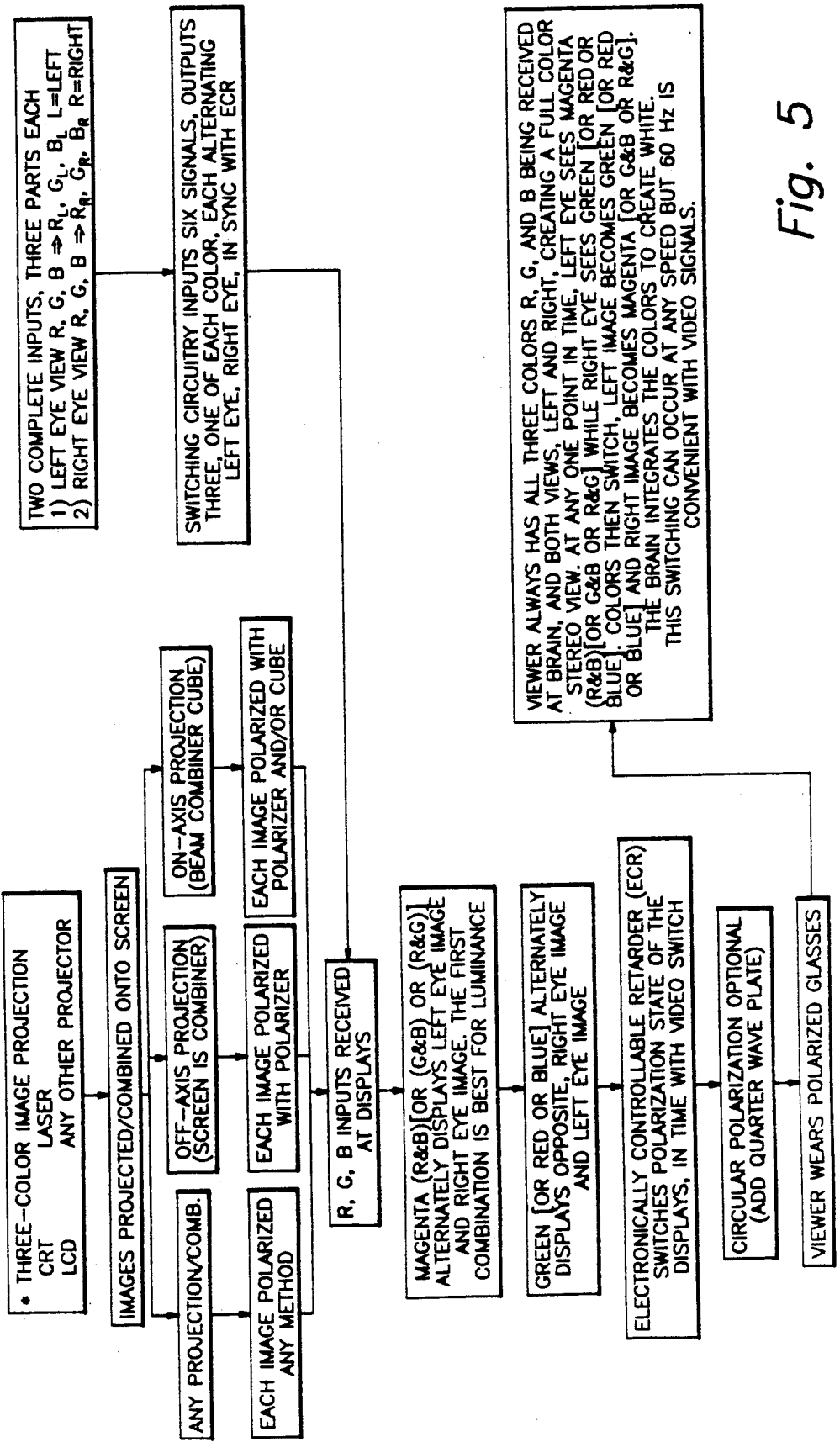
FIG. 5 is the flow diagram of the functional principals of the invention.

FIG. 5 is a flow diagram of the invention's stereoscopic 3D projection display utilizing polarized color multiplexing. It may be noted that the three color image projection may be derived from any kind of image source, such as CRTs, light valves, liquid crystal color matrix displays, lasers and any other image projection device.

Figure 6:
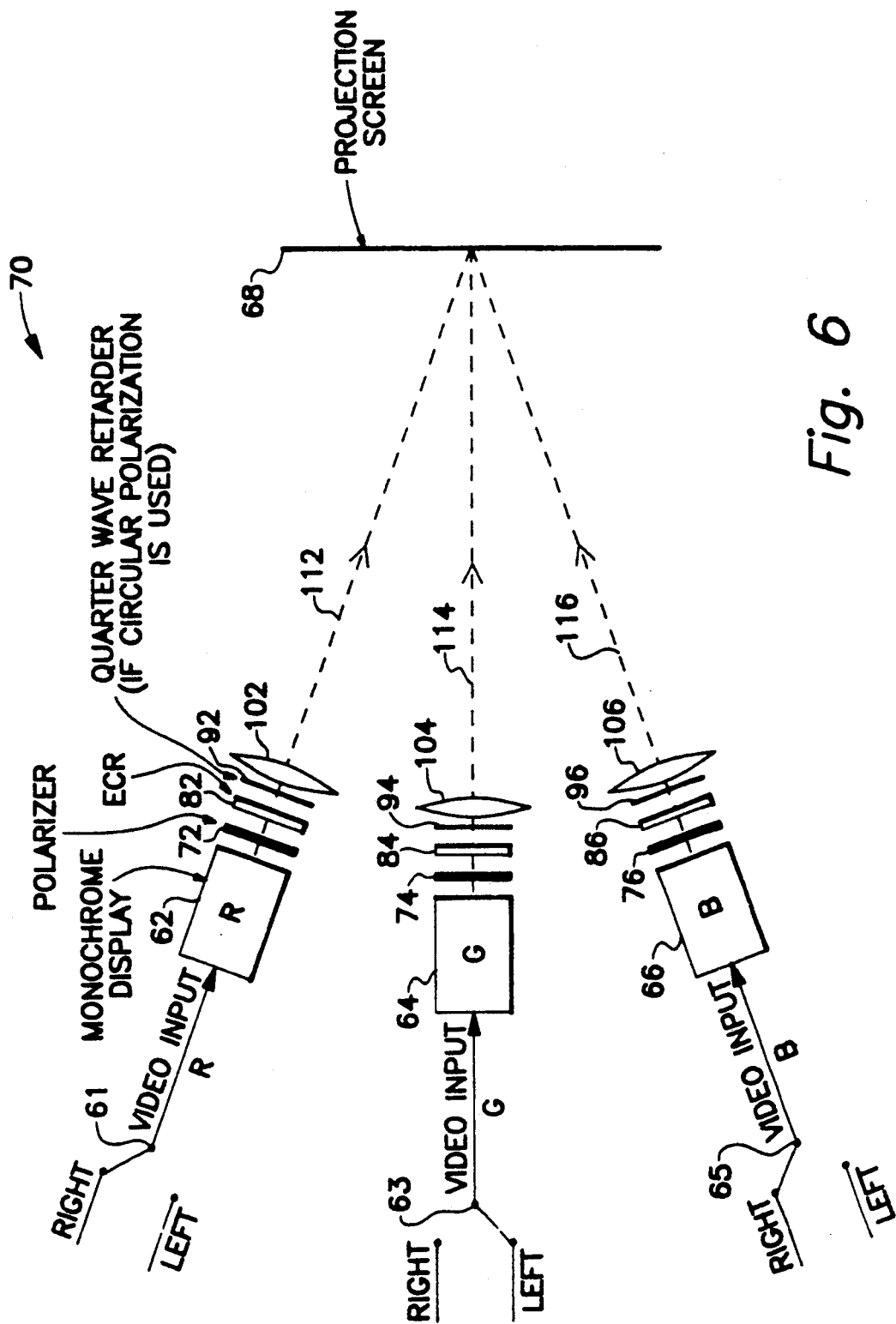
FIG. 6 is a 3D display using polarized color multiplexing and off-axis projection.

FIG. 6 shows embodiment 70 which is a system that uses projection screen 68 rather than prism 12 to combine red, green and blue images 112, 114 and 116. System 70 is a 3D projection display utilizing polarized color multiplexing and off-axis projection. Absent combiner prism 12, system 70 of FIG. 6 resembles system 50 of FIG. 2. System 70 of FIG. 6 and the below-noted description of off-axis projection system 70 set forth the best mode contemplated by the inventors of carrying out their invention. Red display 62 and blue display 66 initially provide the right image of a scene on projection screen 68 and, at the same time, green display 64 provides the left image of the scene on projection screen 68. Polarizers 72 and 76 provide "S" polarization to images 112 and 116. Polarizer 74 provides "P" polarization to green image 114. ECRs 82 and 86 change the polarization state of images 112 and 116 from "S" to "P" polarization and vice versa. ECR 84 switches the "P" polarization of image 114 to "S" polarization and vice versa. When polarization states are switched by ECRs 82, 84 and 86, the video inputs 61 and 65 to displays 62 and 66 are switched from right to left images and vice versa as ECRs 82 and 84 switch again; and, correspondingly, video input 63 to display 64 switches from left to right images as ECR 84 switches polarization, and vice versa. The synchronized switching of the video inputs to displays 62, 64 and 66 and ECRs 82, 84 and 86 eliminates the possibility of binocular rivalry caused by each eye's seeing only images of constant color. The "S" polarization of displays 62 and 66 may be converted to left circular polarization by quarter wave retarders 92 and 96, respectively, and the "P" polarization of the image from display 64 may be converted to right circular polarization by quarter wave retarder 94. If circular polarization is used, then the viewer will wear glasses having circular polarized lenses to view the color 3D display on projection screen 68. Projection lenses 102, 104 and 106 focus images 112, 114 and 116, respectively, on projection screen 68. Circular polarization is preferred over linear polarization since it renders the 3D display independent of the viewers orientation. Alternatively, display source 62 or 66 of system 70 may be a magenta display source and the remaining red or blue display source may be eliminated.

Figure 7:
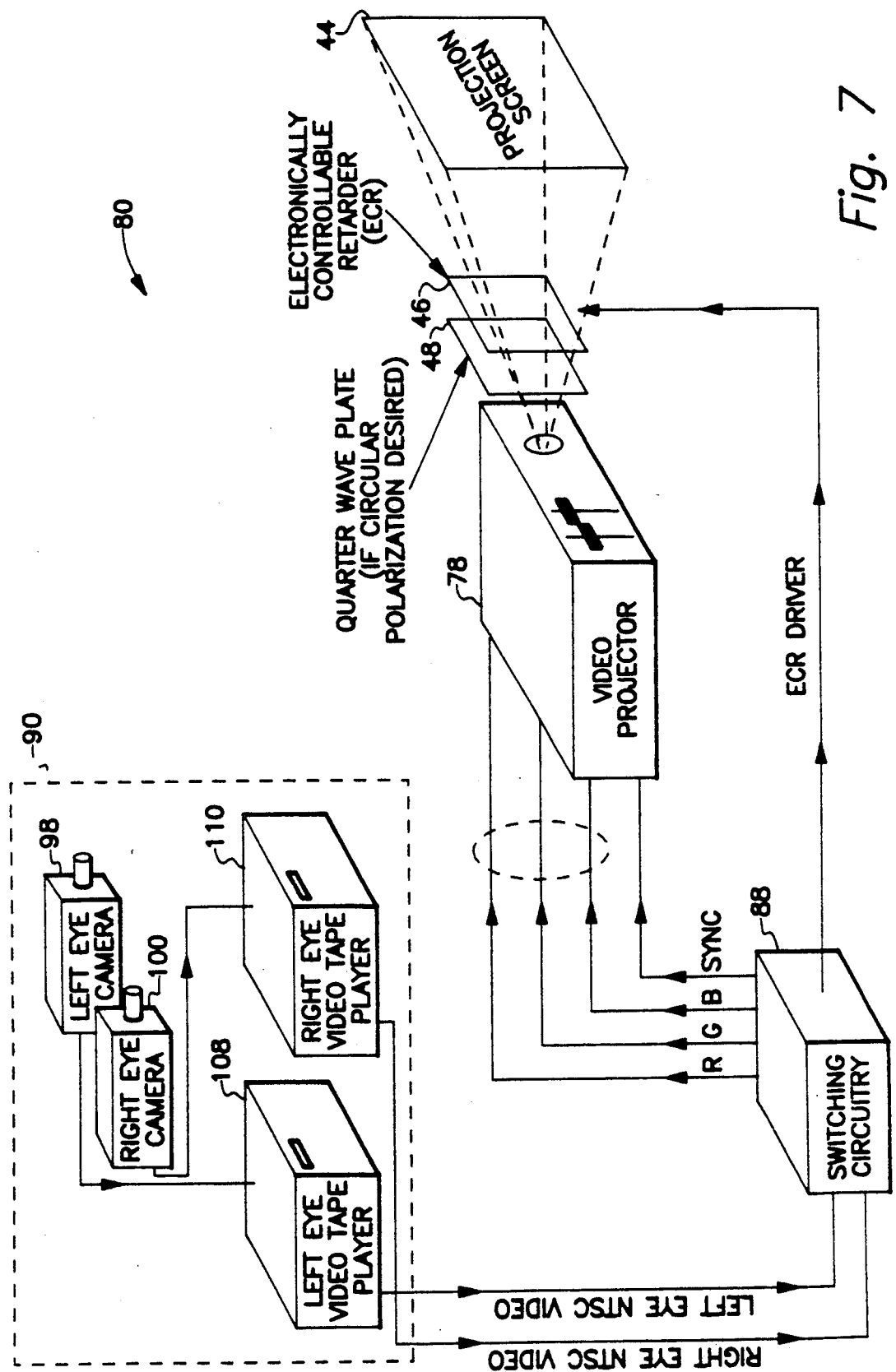
FIG. 7 is a diagram showing the components of a system incorporating the invention.

FIG. 7 shows a general system 80 implementing the invention and revealing integration of various basic components into a 3D projection display system. Video projector 78 comprises a configuration like that of device 10 or of device 70. Switching circuitry 88 provides switching to ECR 46 and reverses the red and blue images with the green images in synchronization with ECR 46 switching. The right and left scene video information to switching circuit 88 is from source 90. Source 90 can be any video stereo pair generator, but as shown, it has left scene or perspective video tape player 108 for left eye viewing and a right scene or perspective video tape player 110 for right eye viewing. The left scene or perspective may be sensed by camera 98 and the right scene or perspective image may be sensed by camera 100. Thus, the color 3D pictures scene by the viewer on screen 44 may be either live or recorded programming.

Figure 8:
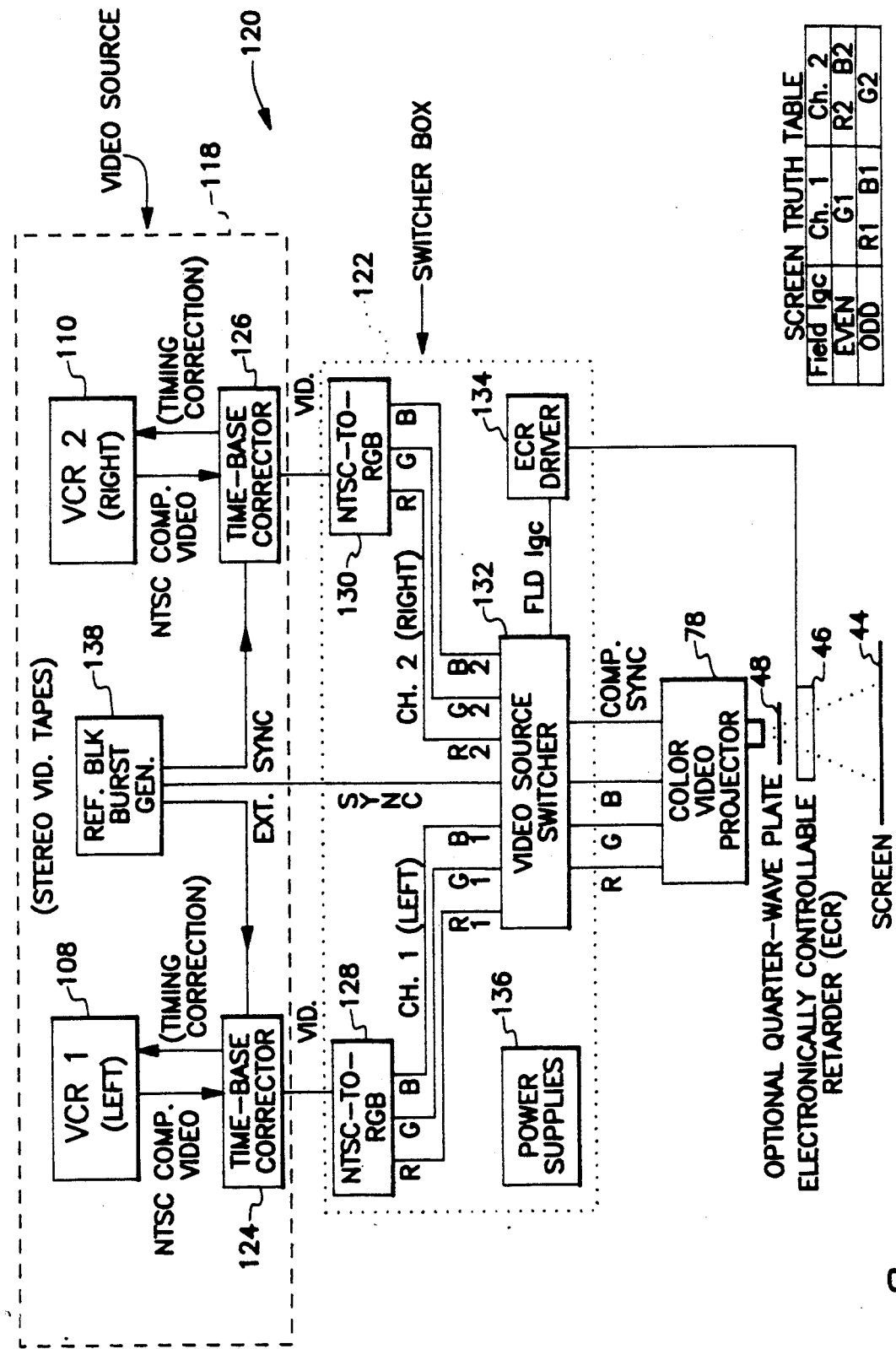
FIG. 8 is a block diagram of the components of a system incorporating the invention that include VCRs as a source of video images.

An electronic block diagram, implementing the invention into system 120 which incorporates recording or playing devices 108 and 110, is shown in FIG. 8. Color video projector 78, along with quarter wave plate 48, ECR 46 and projection screen 44, may be like that of projector 78 of system 80 in FIG. 7. Switcher box 122 resembles switching circuitry 88 of FIG. 7. Within switcher box 122 of Figure there is video source switcher which receives left and right perspective images of the scene and presents them to the displays of the color video projector in an order and manner consistent with the signal from ECR driver 134 to ECR 46. Switcher 132 provides field logic for ECR driver 134. According to the truth table in FIG. 8, for even logic there is a green image for the left perspective of channel 1, and red and blue images for the right perspective of channel 2. For indications of odd logic there are red and blue images for the left perspective of channel 1 and a green image for the right perspective of channel 2. NTSC (National Television Systems Committee)-to-RGB (red, green and blue) converters 128 and 130 convert NTS video signals from video source 118 for conversion into red green and blue images for left and right perspectives. Switcher box 122 may also incorporate power supplies 136 for system 120. Video source 118 consists of video recorders 108 and 110 for playing or recording left and right stereo video tapes, respectively. Video machines 108 and 110 output NTSC composite video signals to time base correctors 124 and 126, respectively. Reference black burst generator 138 outputs external sync signals to time base correctors 124 and 126, and to video source switcher 132 of switcher box 122. Time base correctors 124 and 126 feed back timing correction signals to video machines 108 and 110, respectively. Time base correctors 12 and 126 output-timed NTSC video signals to switcher box 122.

Figure 9:
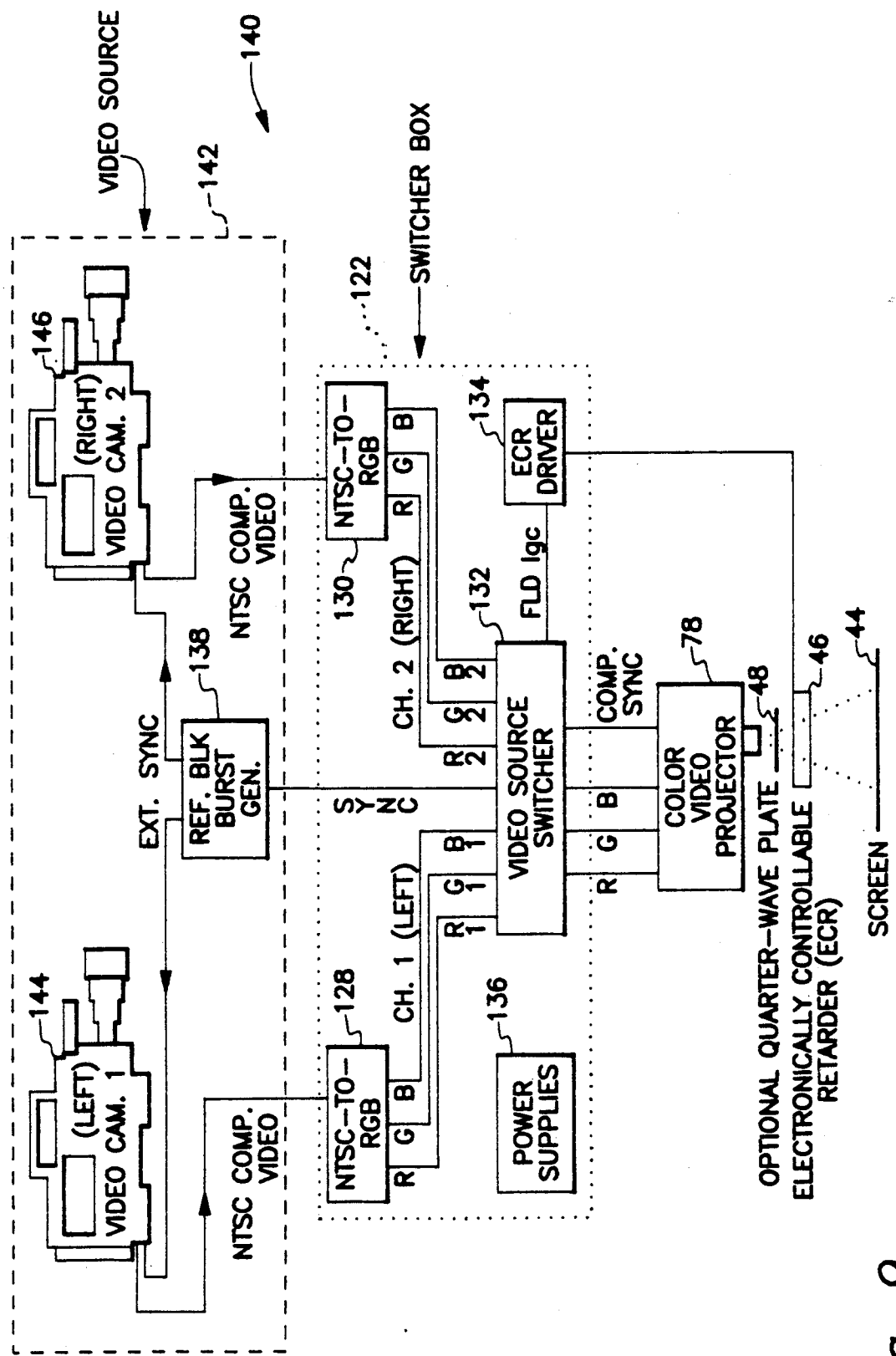
FIG. 9 is a block diagram of the components of a system incorporating the invention having video cameras as a source of the images.

FIG. 9 shows system 140 incorporating the invention. System 140 is similar to system 120 of FIG. 8 except that system 140 utilizes as its video source 142 video cameras 144 and 146 rather than video machines 108 and 110 as in system 120. Video camera 144 views the left perspective of the scene and video camera 146 views the right perspective of the scene thereby providing live three-dimensional color coverage to the viewer. Cameras 144 and 146 output NTSC composite video signals to switcher box 122. Reference black signal generator 138 provides external sync signals to cameras 144 and 146 and to switcher box 122.

We claim:

1. A full-color, three-dimensional single display comprising:
   first source means for providing a first light of first imagery having a first color and a first polarization;
   second source means for providing a second light of second imagery having a second color and a second polarization;
   combining means for combining the first and second lights into a third light;
   projection means for projecting the third light on display means;
   polarization switching means, situated between said source means and said display means, for switching the first polarization to the second polarization and for switching the second polarization to the first polarization;
   first source switching means, connected to said first source means and to said polarization switching means, for switching the first imagery to the second imagery and vice versa coinciding with the switching of said polarization switching means; and
   second source switching means, connected to said second source means and to said polarization switching means, for switching the second imagery to the first imagery and vice versa coinciding with the switching of said first source switching means;
   wherein:
   a viewer looking at said display means with one eye through a first lens having the first polarization and looking at said display means with another eye through a second lens having the second polarization, is enabled to see full-color, three-dimensional third imagery composed of the first and second imageries.

2. Apparatus of claim 1 further comprising a polarization converting means, situated between said source means and said display means, for converting the first and second polarizations from a first kind of polarization to a second kind.

3. Apparatus of claim 2 wherein said combining means is a prism.

4. Apparatus of claim 3 wherein said prism comprises:
   a transmissive portion that transmits light having the first color and having the first polarization;
   a reflective portion that reflects light having the second color and having the second polarization; and
   wherein said transmissive and reflective portions are positioned so as to emit in one direction light having the first color and the first polarization and light having the second color and the second polarization.

5. Apparatus of claim 4 wherein:
   the first color is green;
   the second color is magenta;
   the first kind of polarization is linear; and
   the second kind of polarization is circular.

6. Apparatus of claim 5 wherein:
   said polarization switching means is an electrically controllable half wave retarder; and
   said polarization converting means is a quarter wave retarder.

7. A full-color, three-dimensional single display comprising:
   first source means for providing first imagery having a first color and a first polarization along a first optical path;
   second source means for providing second imagery having a second color and a second polarization along a second optical path;
   third source means for providing the second imagery having a third color and the second polarization along a third optical path;

combining means for combining the imageries along a fourth optical path;

projection means for projecting the imageries along the fourth optical path onto display means;

polarization switching means, situated between said source means and said display means, for switching the first polarization to the second polarization and for switching the second polarization to the first polarization;

first source switching means, connected to said first source means and to said polarization switching means, for switching the first imagery to the second imagery and vice versa coinciding with the switching of said polarization switching means;

second source switching means, connected to said second source means and to said polarization switching means, for switching the second imagery to the first imagery and vice versa coinciding with the switching of said first source switching means; and third source switching means, connected to said third source means and to said polarization switching means, for switching the second imagery to the first imagery and vice versa coinciding with the switching of the first source switching means;

wherein:

a viewer looking at said display means with one eye through a first lens having the first polarization and looking at said display means with another eye through a second lens having the second polarization is enabled to see full-color, three-dimensional third imagery composed of the first and second imageries.

8. Apparatus of claim 7 further comprising a polarization converting means, situated between said source means and said display means, for converting the first and second polarizations from a first kind of polarization to a second kind.

9. Apparatus of claim 8 wherein said combining means is a prism.

10. Apparatus of claim 9 wherein said prism comprises:

a transmissive portion that transmits imagery having the first color and having the first polarization;

a first reflective portion that reflects imagery having the second color and having the second polarization;

a second reflective portion that reflects imagery having the third color and having the second polarization; and wherein said transmissive, first reflective and second reflective portions are positioned so as to emit in one direction imagery having the first color and the first polarization, imagery having the second color and the second polarization, and imagery having the third color and the second polarization.

11. Apparatus of claim 10 wherein:

the first color is green;

the second color is red;

the third color is blue the first kind of polarization is linear; and the second kind of polarization is circular.

12. A full-color, three-dimensional single display comprising:

first source means for providing a first image having a first color and a first polarization along a first optical path;

second source means for providing a second image having a second color and a second polarization along a second path;

display means;

first projection means, associated with said first source means, for projecting the first image along the first optical path onto said display means;

second projection means, associated with said second source means, for projecting the second image along the second optical path onto said display means wherein the second image is combined with the first image;

first polarization switching means, situated in the first optical path between said first source means and display means, for switching the first polarization to the second polarization and vice versa;

second polarization switching means, situated in the second optical path between said second source means and said display means, for switching the second polarization to the first polarization and vice versa coinciding with the switching of said first polarization switching means;

first source switching means, connected to said first source means and to said first polarization means, for switching from the first image to the second image and vice versa coinciding with the switching of said first polarization switching means; and second source switching means, connected to said second source means and to said second polarization switching means, for switching the second image to the first image and vice versa coinciding with the switching of said first source switching means; and wherein:

a viewer looking at said display means with one eye through a first lens having the first polarization and looking at said display means with another eye through a second lens having the second polarization is enabled to see a full-color, three-dimensional third image composed of the first and second images.

13. Apparatus of claim 12 further comprising:

first polarization converting means, situated in the first optical path between said first source means and said display means, for converting the first and second polarization from a first kind to a second kind; and second polarization converting means, situated in the second optical path between said second source means and said display means, for converting the first and second polarizations from the first kind of polarization to a second kind.

14. Apparatus of claim 13 wherein:

the first color is green;

the second color is magenta;

the first kind of polarization is linear; and the second kind of polarization is circular.

15. Apparatus of claim 14 wherein:

said first and second polarization switching means are electrically controllable retarders; and first and second polarization converting means are quarter wave retarders.

16. A full-color, three-dimensional single display comprising:

first source means for providing a first light of a first image having a first color and a first polarization;

second source means for providing a second light of a second image having a second color and a second polarization;

third source means for providing a third light of the second image having a third color and the second polarization;

display means;

first projection means, associated with said first source means, for projecting the first light onto said display means;

second projection means, associated with said second source means, for projecting the second light onto said display means wherein the second light is combined with the first light; and third projection means, associated with said third source means, for projecting the third light onto said display means wherein the light is combined with the first and second light.

17. Apparatus of claim 16 wherein a viewer looking at said display means with one eye through a first lens having the first polarization and looking at said display means with another eye through a second lens having the second polarization is enabled to see a full-color, three-dimensional third image component of the first and second images.

18. A full-color, three-dimensional single display comprising:

a first source for emitting first imagery in a first color and having a first polarization;

a second source for emitting second imagery in a second color and having a second polarization;

a display screen;

a combiner, associated with said first and second sources, for combining first and second imagery into third imagery;

a projection lens, situated between said combiner and said display screen, for focusing the third imagery onto said display screen;

a polarization switch, situated between said combiner and said projection lens, for switching the first polarization to the second polarization and for switching the second polarization to the first polarization;

a first source switch, connected to said first source and to said polarization switch, for switching the first imagery to the second imagery and vice versa coinciding with the switching of polarizations by said polarization switch; and a second source switch, connected to said second source and to said polarization switch, for switching the second imagery to the first imagery and vice versa coinciding with the switching of said first source switch; and wherein:

a viewer looking at said display screen through a set of polarized lens is enabled to see the third imagery in full-color and three-dimensions.

19. Apparatus of claim 18 further comprising a polarization converter, situated between said combiner and said projection lens, for converting the first and second polarizations from one kind polarization to another kind.

20. Apparatus of claim 19 wherein:

said combiner is a prism;

the first color is green;

the second color is magenta;

said polarization switch is an electrically controllable half-wave retarder; and said polarization converter is a quarter-wave retarder.

21. Apparatus of claim 19 further comprising:

a first video player/recorder connected to said first and second source switches; and a second video player/recorder connected to said first and second source switches.

22. Apparatus of claim 19 further compromising:

a first video camera connected to said first and second source switches; and a second video camera connected to said first and second source switches.

23. A full-color, three-dimensional single display comprising:

a first plurality of sources for providing a first set of images wherein each source provides images in a particular color;

a second plurality of sources for providing a second set of images wherein each source provides images in a particular color;

combining means for combining the first and second sets of images into a third set of images;

display means; and projection means for conveying the first and second sets of images to said display means; and wherein:

when said first set of images represents a first perspective of a three-dimensional scene, then said second set of images portrays a second perspective of the three-dimensional scene;

when said first set of images represents the second perspective of the three-dimensional scene, then said second set of images portrays the first perspective of the three-dimensional scene;

the images representing the first perspective have a first polarization;

the images representing the second perspective have a second polarization; and a view looking at said display means with one eye through a first lens having the first polarization and looking at said display means with another eye through a second lens having the second polarization, is enabled to see the third set of images as the three-dimensional scene in full color.

24. Apparatus of claim 23 further comprising:

polarization switching means, situated between said plurality of sources and said display means, for switching the first polarization to the second polarization and for switching the second polarization to the first polarization, and vice versa; and sources switching means, connected to said plurality of sources and to said polarization switching means, for switching the first set of images to the second set of images and vice versa, coinciding with the switching of said polarization switching means.

25. Apparatus of claim 24 further comprising a polarization converting means, situated between said plurality of sources and said display means, for converting the first and second polarizations from a first kind of polarization to a second kind.

26. A method of providing full-color, three-dimensional images to a viewer, comprising:

providing a first set of images of a first perspective of a three-dimensional scene;

providing a second set of images of a second perspective of the three-dimensional scene;

polarizing the first set of images with a first polarization;

polarizing the second set of images with a second polarization;

combining the first set of images and the second set of images into a combination of images;

displaying the combination of images to the viewer who can view the images with one eye through a first lens having the first polarization and with the other eye through a second lens having a second polarization, wherein the viewer is enabled to see the combination of images in full color and three dimensions;

switching the first polarization of the first set of images to the second polarization, and vice versa;

switching the second polarization of the second set of images to the first polarization, and vice versa; and changing the first set of images from the first perspective to the second perspective and the second set of images from the second perspective to the first perspective and vice versa, wherein the changing is synchronized with the switching of the polarizations.

27. Method of claim 26 further comprising converting the first and second polarizations from a first kind of polarization to a second kind of polarization.

* * * * *

UNITED STATES PATENT AND TRADEMARK OFFICE
CERTIFICATE OF CORRECTION

PATENT NO.  : 4,995,718
DATED       : February 26, 1991
INVENTOR(S) : K.E. Jachimowicz and R.S. Gold It is certified that error appears in the above-identified patent and that said Letters Patent is hereby corrected as shown below:

Column 9, line 24, cancel "component" and substitute
--composed--.

Column 10, line 39, cancel "view" and substitute
--viewer--.

Signed and Sealed this

Twenty-seventh Day of October, 1992

Attest:

DOUGLAS B. COMER

Attesting Officer            Acting Commissioner of Patents and Trademarks